United States Patent [19]

Feigel et al.

[11] Patent Number: 5,641,211
[45] Date of Patent: Jun. 24, 1997

[54] PRESSURE CONTROL VALVE FOR HYDRAULIC SLIP-CONTROLLED BRAKE SYSTEM

[75] Inventors: Hans-Jörg Feigel, Rosbach; Ulrich Neumann, Rossdorf; Lothar Schiel, Hofheim, all of Germany

[73] Assignee: ITT Automotive Europe GmbH, Frankfurt, Germany

[21] Appl. No.: 481,532

[22] PCT Filed: Oct. 26, 1994

[86] PCT No.: PCT/EP94/03524

§ 371 Date: Sep. 14, 1995

§ 102(e) Date: Sep. 14, 1995

[87] PCT Pub. No.: WO95/12509

PCT Pub. Date: May 11, 1995

[30] Foreign Application Priority Data

Nov. 5, 1993 [DE] Germany ............... 43 37 763.7

[51] Int. Cl.⁶ ............................. B60T 8/36; F16K 31/06
[52] U.S. Cl. ................... 303/119.2; 137/627.5; 303/84.2
[58] Field of Search ............... 303/119.2, 119.1, 303/84.1, 84.2, 117.1, 118.1, 40, 28–30; 251/129.08, 129.01, 125.15, 129.02, 129.18, 129.1; 91/433, 454, 439, 31, 459; 137/627.5, 625.66, 625.65, 596.17, 625.64

[56] References Cited

U.S. PATENT DOCUMENTS

| | | | |
|---|---|---|---|
| 3,921,666 | 11/1975 | Leiber | 303/119.2 |
| 4,275,758 | 6/1981 | Masuda . | |
| 4,452,267 | 6/1984 | Ott et al. . | |
| 4,860,794 | 8/1989 | Parrott et al. . | |
| 4,938,545 | 7/1990 | Shuey et al. . | |
| 5,191,827 | 3/1993 | Kervagoret | 137/596.17 |
| 5,290,096 | 3/1994 | Beck et al. . | |
| 5,332,304 | 7/1994 | Maas | 303/119.2 |
| 5,410,943 | 5/1995 | Kervagoret | 303/119.2 |

FOREIGN PATENT DOCUMENTS

| | | |
|---|---|---|
| 0119921 | 9/1984 | European Pat. Off. . |
| 0413172 | 2/1991 | European Pat. Off. . |
| 0595014 | 5/1994 | European Pat. Off. . |
| 2208078 | 6/1974 | France . |
| 1214963 | 4/1966 | Germany . |
| 2257213 | 7/1974 | Germany . |
| 2751150 | 5/1979 | Germany . |
| 3543882 | 6/1987 | Germany . |
| 2909504 | 2/1988 | Germany . |
| 4028606 | 3/1992 | Germany . |
| 4112136 | 10/1992 | Germany . |
| 9222451 | 12/1992 | WIPO . |

OTHER PUBLICATIONS

European Search Report dated Feb. 9, 1995.
German Search Report dated Oct. 20, 1994.
English–language translation of Form PCT/ISA/210.
English–language translation of Abstracts for foreign patent documents asterisked above (from Derwent World Pat.).

*Primary Examiner*—Douglas C. Butler
*Attorney, Agent, or Firm*—Thomas N. Twomey; J. Gordon Lewis

[57] ABSTRACT

A pressure control valve has a valve-closing member displaceable relative to the valve lifter in order to control the flow of pressurized medium between a first and second pressurized medium connection. A third pressurized medium connection is severed from the second pressurized medium connection by another valve-closing member that can be actuated by the valve lifter.

11 Claims, 1 Drawing Sheet

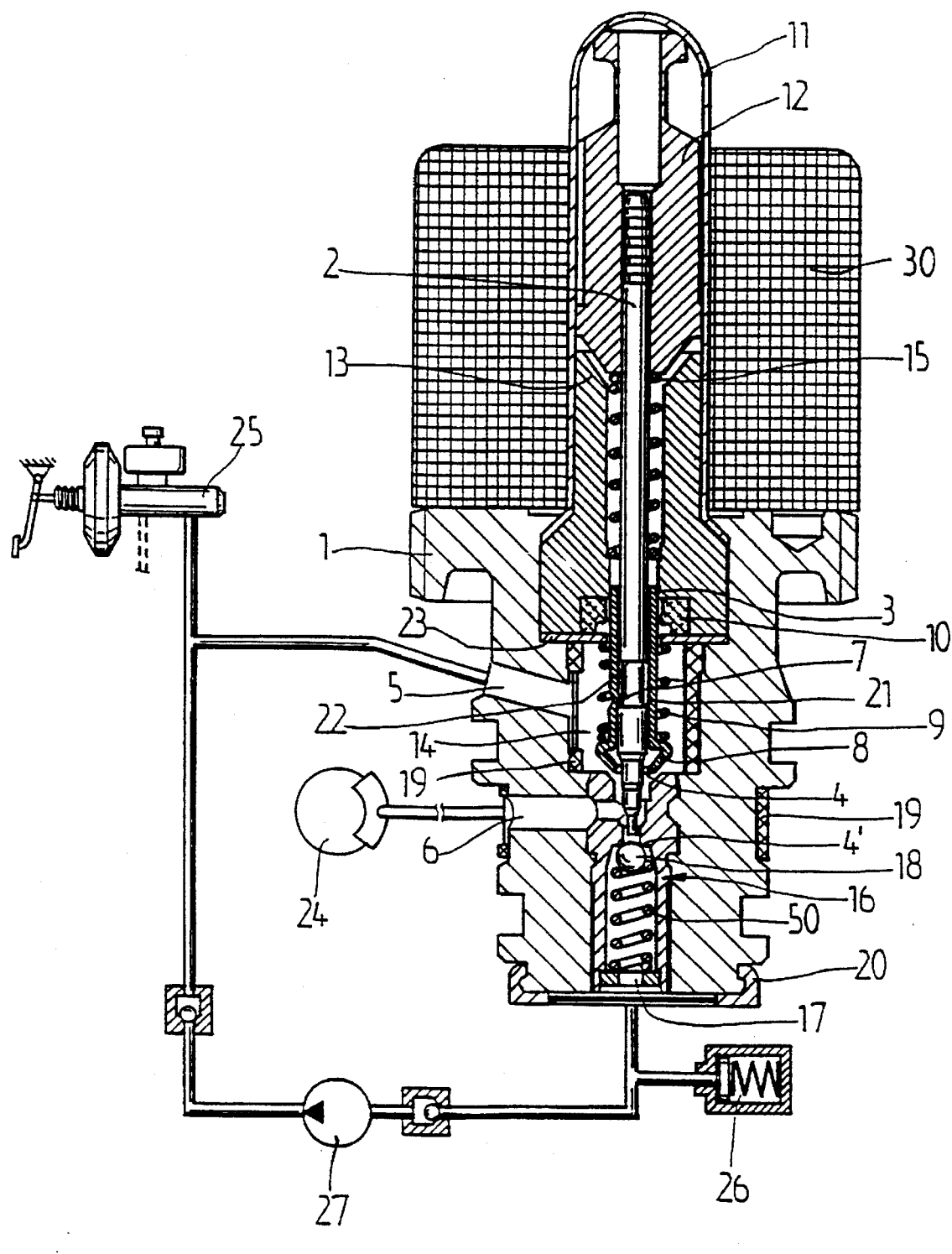

PRESSURE CONTROL VALVE FOR HYDRAULIC SLIP-CONTROLLED BRAKE SYSTEM

This application is the U.S. national-phase application of PCT International Application No. PCT/EP94/03524.

FIELD OF THE INVENTION

The present invention pertains to a pressure control valve, especially an electrically energizable multiway valve for slip-controlled hydraulic brake systems. More specifically, the present invention is directed to a pressure control valve for selectively connecting a main cylinder to a wheel brake and for selectively connecting a wheel brake to a pressure medium collector.

BACKGROUND OF THE INVENTION

German patent DE 29 09 504 C2 discloses a pressure control valve, in which the valve lifter is designed as a slide valve for pressure control in order to establish a pressurized medium communication between a first pressurized medium connection and a second pressurized medium connection in a first switching position, and to sever the connection in a second switching position of the slide valve. In a third switching position of the slide valve, the valve lifter opens a ball check valve, as a result of which an additional pressurized medium connection from the second pressurized medium connection is opened.

However, the pressure control valve has the disadvantage that the slide valve requires a high accuracy of fit to control manufacturing or temperature dependent leakage flows. In addition, no measure is provided to ensure the pressure reduction in the connected line system in the case of jamming of the slide valve in the closed position.

SUMMARY OF THE INVENTION

The present invention is directed to improving a pressure control valve of the above-described type such that a reliable operating pressure control and a compact, miniaturized design are guaranteed with simple means.

The pressure control valve according to the present invention includes a valve slide member arranged in the valve housing which is displaceable in relation to the valve lifter and can be brought into contact with a valve seat arranged in the valve housing. In this way, a first pressurized medium connection is severed from a second pressurized medium connection in the closed position of the additional valve-closing member designed as a seat valve.

More specifically, the pressure control valve of the present invention includes a valve housing defining a first pressurized medium connection leading to the main cylinder, a second pressurized medium connection leading to the wheel brake, and a third pressurized medium connection leading to said pressure medium collector. A first valve includes a first valve closing member and a first valve seat disposed in the valve housing between the second and third pressurized medium connections. A second valve includes a second valve closing member and a second valve seat disposed in the valve housing between the first and second pressurized medium connections. The is second valve closing member is disposed in the valve housing, is axially displaceable relative to a valve lifter, and is axially movable along the valve housing.

The valve lifter of the present invention is axially movable along the valve housing to first, second and third switching positions. At the first switching position, the first valve closing member is urged against the first valve seat to close the first valve and the second valve is open. At the second switching position, the first valve is closed and the second valve closing member is in abutment with the second valve seat to close the second valve. At the third switching position, the valve lifter axially displaces the first valve closing member from the first valve seat to open the first valve and the second valve is closed.

The features and advantages of the present invention will be explained in detail below on the basis of an exemplary embodiment.

BRIEF DESCRIPTION OF THE DRAWING

The figure shows an enlarged longitudinal section of a pressure control valve according to the present invention and portions of a brake circuit with which the pressure control valve may be used.

DETAILED DESCRIPTION OF THE INVENTION

The pressure control valve shown in the figure has a valve housing 1 having a cartridge design (for example, a wedged cartridge, screw cartridge, or clamped cartridge). A valve sleeve 11 with an armature 12 is prepared by the deep-drawing process and is held in the valve housing 1, which is made of a steel or light metal alloy, by a wedging provided on the valve sleeve 11 in the end area. The armature 12, designed as a proportional magnet, is located in the dome area of the valve sleeve 11. A valve lifter 2, which extends through a hole of the magnet core 13 into a pressure chamber 14 in which a valve-closing member 3 is disposed, is arranged on the armature 12. A valve coil 30, which ensures the electromagnetic actuation of the armature 12, is attached to the valve sleeve 11.

In the electromagnetically non-excited starting position of the pressure control valve, a spring 15 placed between the magnet core 13 and the armature 12 holds the valve lifter 2 in a starting position, which permits pressurized medium communication between a first pressurized medium connection 5 and a second pressurized medium connection 6. The first pressurized medium connection 5 opens into the pressure chamber 14 above the valve seat 4, while the second pressurized medium connection 6 opens into the pressure chamber 14 below the valve seat 4 but above the valve seat 4'. The two valve seats 4, 4', which are arranged diametrically to one another, are arranged as conical sealing seats in a sleeve-like valve insert 16, which is preferably fastened in the downwardly tapered pressure chamber 14 designed as a stepped hole by means of a self-wedging area.

A third pressurized medium connection 17 opening into the valve housing 1 from the bottom along the axis of symmetry of the valve is severed from pressurized medium connections 5, 6 in the starting position of the valve by a spring-loaded valve-closing member 18 in the valve insert 16. Ring filters 19 and plate filters 20 are located inside or outside the valve housing 1 to ensure the cleanness of the valve.

The arrangement and the cooperation of the valve-closing member 3, which is mounted coaxially with the valve lifter 2 but displaceable relative to the valve lifter 2, is an essential feature of the present invention. Valve-closing member 3 is designed as a sleeve, and its lifting movement via a carrier 7 is limited to the tapered transition area of the valve lifter 2 which has a reduced cross section in this transition area as shown in the figure. Carrier 7 may be formed by a partial radially-inward tapering of the sleeve and is in contact with the lower shoulder 21 of the tapered transition area in the inactive starting position of the pressure control valve. Valve-closing member 3 is urged by a compression spring 9 acting in the valve closing direction. The sleeve-like valve-closing member 3 may be made of a tubular bar material as a simple light-gauge sheet metal part, so that it is also possible as a result to accurately manufacture the conical valve-closing body 8 and the carrier 7 relatively easily by shaping without cutting.

At the same time, the sleeve-like valve-closing body 3 also makes possible a bypass connection between the second and first pressurized medium connections 6, 5. A fitting clearance exists between the valve-closing body 3 and the valve lifter 2, which is necessary for the freedom of relative movement between the valve-closing body 3 and the valve lifter 2. Through this fitting clearance, pressurized medium can escape to the main cylinder 25 from the second pressurized medium connection 6 via the ring cuff 10 by reducing the main cylinder pressure in the first pressurized medium connection 5. According to the figure, the ring cuff 10 is inserted into the lower step of the hole of the magnet core 13, and it is securely positioned by a washer 23, which is clamped between the magnet core 13 and the stepped hole of the valve housing 1. The ring cuff 10 is designed as a check valve, and it opens in the direction from the wheel brake 24 to the main cylinder 25. The armature 12 is under the wheel pressure.

The mode of operation of the pressure control valve will be explained below in conjunction with a slip-controlled hydraulic brake system.

The figure shows the pressure control valve in the electromagnetically non-excited switching position, which also corresponds, in the case of a slip-controlled brake system, to the brake release position and to the normal braking phase. In this position, the valve lifter 2 is in a first switching position. Thus, there is an unhindered pressurized medium communication from the main cylinder 25 via the first pressurized medium connection 5, the ring filter element 19, the pressure chamber 14, the opened, sleeve-like valve-closing member 3, as well as via the flow cross section between the valve insert 16 and the valve lifter 2 to the second pressurized medium connection 6, which is connected to the wheel brake 24.

When unacceptably high wheel slip signals appear, which are recognized by suitable means of a signal evaluation electronic unit in the case of overbraking, a current-generated excitation of the coil 30 to a first excitation level takes place, so that the armature 12 performs a current-proportional lifting movement. This causes the valve lifter 2 to move to a second switching position, at which the sleeve-like valve-closing member 3 abuts against valve seat 4. As valve lifter 2 is moved in the valve closing direction, the valve-closing member 3 is caused to move with valve lifter 2 due to compression spring 9 urging carrier 7 against lower shoulder 21, until valve closing body 8 abuts against valve seat 4. The pressure generated in the pressure chamber 14 (for example, by main cylinder 25 and/or pump pressure) is thus unable to propagate into the second pressurized medium connection 6, i.e., to the wheel brake 24, so that the pressure control valve is in the pressure-maintaining phase. The compression spring 50 supports the valve-closing member 18, and holds it tightly on the valve seat 4' against the confined pressure in the chamber of the pressurized medium communication 6.

To initiate the pressure reduction phase in the wheel brake 24, the armature 12 is completely energized (representing, for example, a second excitation level), so that a further lifting movement of the valve lifter 2 to a third switching position causes valve closing member to become unseated from valve seat 4'. Consequently, the wheel brake pressure reaches, via the second pressurized medium connection 6 and via the third pressurized medium connection 17, a pressurized medium collector 26, which is usually connected to a pressurized medium pump 27. The pump 27 must be activated at the time of the initiation of the pressure reduction phase at the latest in order to facilitate a rapid brake pressure reduction and to provide a sufficient amount of pressurized medium for the main cylinder 25 or for the pressure control valve at the beginning of a next pressure build-up cycle.

A pressure reduction can be induced manually in the main cylinder 25 by, for example, permitting the brake pedal to be moved into the release position. If such a pressure reduction occurs during the pressure-maintaining or pressure build-up phase (i.e., when valve closing body is in abutment with valve seat 4), a pressure reduction in the wheel brake 24 can nonetheless take place via the clearance fit acting as a bypass channel between the valve lifter 2 and the valve-closing member 3 in the direction of the nonreturn cuff 10 opening in the direction of the main cylinder 25.

The present invention is characterized by an especially low-noise, simple and compact valve design, which combines in itself the advantages of the prior-art ABS inlet and outlet seat valves designed as 2/2-way valves with an analogous valve control. In the invention described here, the main cylinder pressure does not affect the magnetic forces, because the tandem main cylinder pressure is compensated as a consequence of the use of an inlet valve closing member acting as a seat valve. Small coils with low power consumption may be used. Moreover, a simplification of the electronic unit is possible because of the pressure control between the second and third pressurized medium connections, and because no additional electrical actuators for actuating the ball check valve are necessary.

List of Reference Numbers

1 Valve housing
2 Valve lifter
3 Valve-closing member
4, 4' Valve seat
5 Pressurized medium connection
6 Pressurized medium connection
7 Carrier
8 Valve-closing body
9 Compression spring
10 Nonreturn cuff
11 Valve sleeve
12 Armature
13 Magnet core
14 Pressure chamber
15 Valve coil
16 Valve insert
17 Pressurized medium connection
18 Valve-closing member
19 Ring filter
20 Plate filter
21 Shoulder
22 Shoulder
23 Washer
24 Wheel brake
25 Main cylinder
26 Pressurized medium collector
27 Pump 30 Valve coil
50 Compression spring

We claim:

1. A pressure control valve for slip-controlled hydraulic brake systems having a main cylinder, a wheel brake, and a pressure medium collector, said pressure control valve comprising:
 a valve housing defining:
  (a) a first pressurized medium connection leading to said main cylinder,
  (b) a second pressurized medium connection leading to said wheel brake, and
  (c) a third pressurized medium connection leading to said pressure medium collector;
 a first valve comprising:
  (a) a first valve seat disposed in said valve housing between said second pressurized medium connection and said third pressurized medium connection, and
  (b) a first valve closing member;
 a second valve comprising:
  (a) a second valve seat disposed in said valve housing between said first pressurized medium connection and said second pressurized medium connection, and
  (b) a second valve closing member, which is disposed in said valve housing and is axially movable along said valve housing and has an outer wall;
 a valve lifter, which is disposed in said valve housing, is axially displaceable relative to said second valve closing member, and is axially movable along said valve housing to:
  (a) a first switching position, at which said first valve closing member is against said first valve seat to close said first valve and at which said second valve is open,
  (b) a second switching position, at which said first valve is closed and at which said second valve closing member is in abutment with said second valve seat to close said second valve, and
  (c) a third switching position, at which said valve lifter axially displaces said first valve closing member from said first valve seat to open said first valve and at which said second valve is closed; and
 a ring cuff, which is arranged on said outer wall and which obstructs pressurized medium from flowing from said first pressurized medium connection to said second pressurized medium connection when said second valve is closed, and permits pressurized medium from flowing from said second pressurized medium connection to said first pressurized medium connection when said second valve is closed.

2. A pressure control valve in accordance with claim 1, wherein said second valve closing member is a seat valve aligned coaxially with said valve lifter.

3. A pressure control valve in accordance with claim 2, wherein:
 said valve lifter includes a transition area having a reduced cross section defined by a lower shoulder and an upper shoulder;
 said second valve closing member includes a carrier which is in contact with said valve lifter at said transition area; and
 said pressure control valve further comprises a compression spring which urges said carrier of said second valve closing member against said lower shoulder of said valve lifter, wherein:
  (a) as said valve lifter moves from said first switching position to said second switching position, said second valve closing member is moved in the valve closing direction by said compression spring urging said carrier against said lower shoulder,
  (b) as said valve lifter moves from said second switching position to said first switching position, said second valve closing member is moved in the valve opening direction by said lower shoulder driving said carrier against said compression spring, and
  (c) as said valve lifter moves from said second switching position to said third switching position, said valve lifter moves relative to said second valve closing member.

4. A pressure control valve in accordance with claim 3, wherein said carrier is formed by a partial radially-inward tapering of said valve-closing member.

5. A pressure control valve in accordance with claim 1, wherein said second valve closing member is guided on said valve lifter in a positive-locking manner.

6. A pressure control valve in accordance with claim 1, wherein said second valve closing member is a sleeve.

7. A pressure control valve in accordance with claim 6, wherein said second valve closing member has, on a side facing said second valve seat, a truncated cone-shaped valve-closing body, which is coaxially traversed by said valve lifter.

8. A pressure control valve for slip-controlled hydraulic brake systems having a main cylinder, a wheel brake, and a pressure medium collector, said pressure control valve comprising:
 a valve housing defining:
  (a) a first pressurized medium connection leading to said main cylinder,
  (b) a second pressurized medium connection leading to said wheel brake, and
  (c) a third pressurized medium connection leading to said pressure medium collector;
 a first valve comprising:
  (a) a first valve seat disposed in said valve housing between said second pressurized medium connection and said third pressurized medium connection, and
  (b) a first valve closing member;
 a second valve comprising:
  (a) a second valve seat disposed in said valve housing between said first pressurized medium connection and said second pressurized medium connection, and
  (b) a second valve closing member, which is a seat valve, is disposed in said valve housing, is axially movable along said valve housing, and includes a carrier;
 a valve lifter, which is disposed in said valve housing, is axially displaceable relative to, and aligned coaxially with, said second valve closing member, includes a transition area having a reduced cross section defined by a lower shoulder and an upper shoulder at which transition area said carrier is in contact with said valve lifter, and is axially movable along said valve housing to:
  (a) a first switching position, at which said first valve closing member is against said first valve seat to close said first valve and at which said second valve is open,
  (b) a second switching position, at which said first valve is closed and at which said second valve closing member is in abutment with said second valve seat to close said second valve, and
  (c) a third switching position, at which said valve lifter axially displaces said first valve closing member from said first valve seat to open said first valve and at which said second valve is closed; and a compression spring which urges said carrier of said second valve closing member against said lower shoulder of said valve lifter, wherein:
(a) as said valve lifter moves from said first switching position to said second switching position, said second valve closing member is moved in the valve closing direction by said compression spring urging said carrier against said lower shoulder,
(b) as said valve lifter moves from said second switching position to said first switching position, said second valve closing member is moved in the valve opening direction by said lower shoulder driving said carrier against said compression spring, and
(c) as said valve lifter moves from said second switching position to said third switching position, said valve lifter moves relative to said second valve closing member.

9. A pressure control valve in accordance with claim 8, wherein said second valve closing member has an outer wall, and further comprising a ring cuff, which is arranged on said outer wall and which obstructs pressurized medium from flowing from said first pressurized medium connection to said second pressurized medium connection when said second valve is closed, and permits pressurized medium from flowing from said second pressurized medium connection to said first pressurized medium connection when said second valve is closed.

10. A pressure control valve in accordance with claim 8, wherein said carrier is formed by a partial radially-inward tapering of said valve-closing member.

11. A pressure control valve for slip-controlled hydraulic brake systems having a main cylinder, a wheel brake, and a pressure medium collector, said pressure control valve comprising:

a valve housing defining:
(a) a first pressurized medium connection leading to said main cylinder,
(b) a second pressurized medium connection leading to said wheel brake, and
(c) a third pressurized medium connection leading to said pressure medium collector;

a first valve comprising:
(a) a first valve seat disposed in said valve housing between said second pressurized medium connection and said third pressurized medium connection, and
(b) a first valve closing member;

a second valve comprising:
(a) a second valve seat disposed in said valve housing between said first pressurized medium connection and said second pressurized medium connection, and
(b) a second valve closing member, which is a seat valve having an outer wall, is disposed in said valve housing, and is axially movable along said valve housing;

a valve lifter, disposed in said valve housing, which is axially displaceable relative to said second valve closing member and with which said second valve closing member is aligned coaxially and on which said second valve closing member is guided in a positive-locking manner with a clearance fit, wherein said valve lifter is axially movable along said valve housing to:
(a) a first switching position, at which said first valve closing member is against said first valve seat to close said first valve and at which said second valve is open,
(b) a second switching position, at which said first valve is closed and at which said second valve closing member is in abutment with said second valve seat to close said second valve, and
(c) a third switching position, at which said valve lifter axially displaces said first valve closing member from said first valve seat to open said first valve and at which said second valve is closed; and a ring cuff, which is arranged on said outer wall and which obstructs pressurized medium from flowing from said first pressurized medium connection to said second pressurized medium connection when said second valve is closed, and permits pressurized medium from flowing from said second pressurized medium connection to said first pressurized medium connection when said second valve is closed.

* * * * *